June 25, 1946.  A. C. SCHROEDER  2,402,916
TIMING OF ELECTRICAL PULSES
Filed Feb. 28, 1942   2 Sheets-Sheet 1
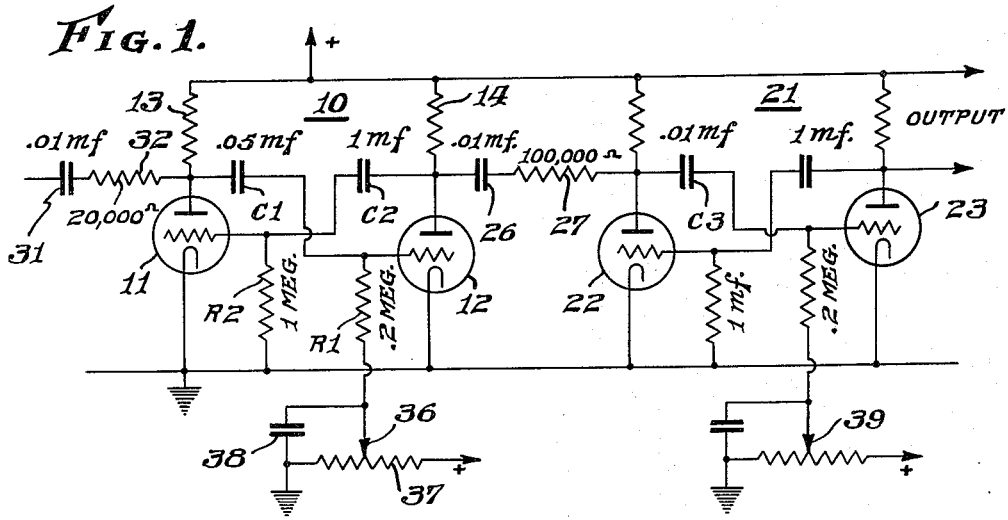
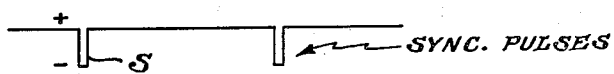
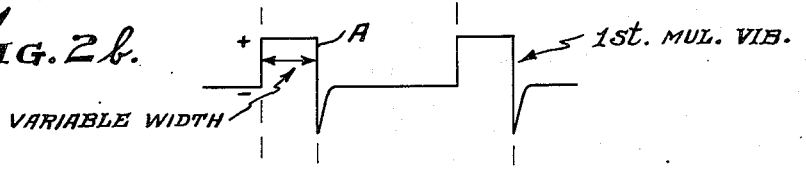
Inventor
Alfred C. Schroeder
By C.D. Tuska
Attorney Inventor
Alfred C. Schroeder
By C. D. Tuska
Attorney Patented June 25, 1946

2,402,916

UNITED STATES PATENT OFFICE 2,402,916

TIMING OF ELECTRICAL PULSES

Alfred C. Schroeder, Camden, N. J., assignor to Radio Corporation of America, a corporation of Delaware Application February 28, 1942, Serial No. 432,907

7 Claims. (Cl. 250—36)

My invention relates to the art of producing electrical pulses having predetermined characteristics and particularly to methods and means for producing pulses that occur in a desired time or phase relation.

Various methods have been proposed for making an electrical pulse start at a fixed predetermined time with respect to other signals or pulses. When it is desired to vary the timing or phase of a pulse during the operation of equipment, however, the problem of providing a satisfactory simple circuit is more difficult.

The principal object of the present invention is to provide an improved method of and means for varying the timing or phase of an electrical pulse.

A further object of the invention is to provide an improved method of and means for obtaining a delayed electrical pulse.

A still further object of the invention is to provide an improved means for producing a series of continuously and sequentially occurring pulses for commutating or switching purposes, or the like.

In a preferred embodiment of the invention two or more multivibrators are connected in cascade and given such time constants that the back edges of the positive pulses from one multivibrator trigger the following multivibrator when properly applied thereto. The multivibrators, when so adjusted, are not self-oscillatory at a frequency in the region of the pulse rate. In other words, the multivibrators function as trigger circuits and have a stable state or one degree of electrical stability within the operating range of the apparatus, i. e., within the region of the desired pulse rate. In one application of the invention the first multivibrator is driven by regularly recurring synchronizing pulses, and the second multivibrator is driven by the back edges of positive pulses from the first multivibrator to produce pulses starting later than the synchronizing pulses by the width of the first multivibrator pulses. The first multivibrator pulse width is made variable whereby the starting time of the later pulses may be adjusted or varied.

Figure 3:
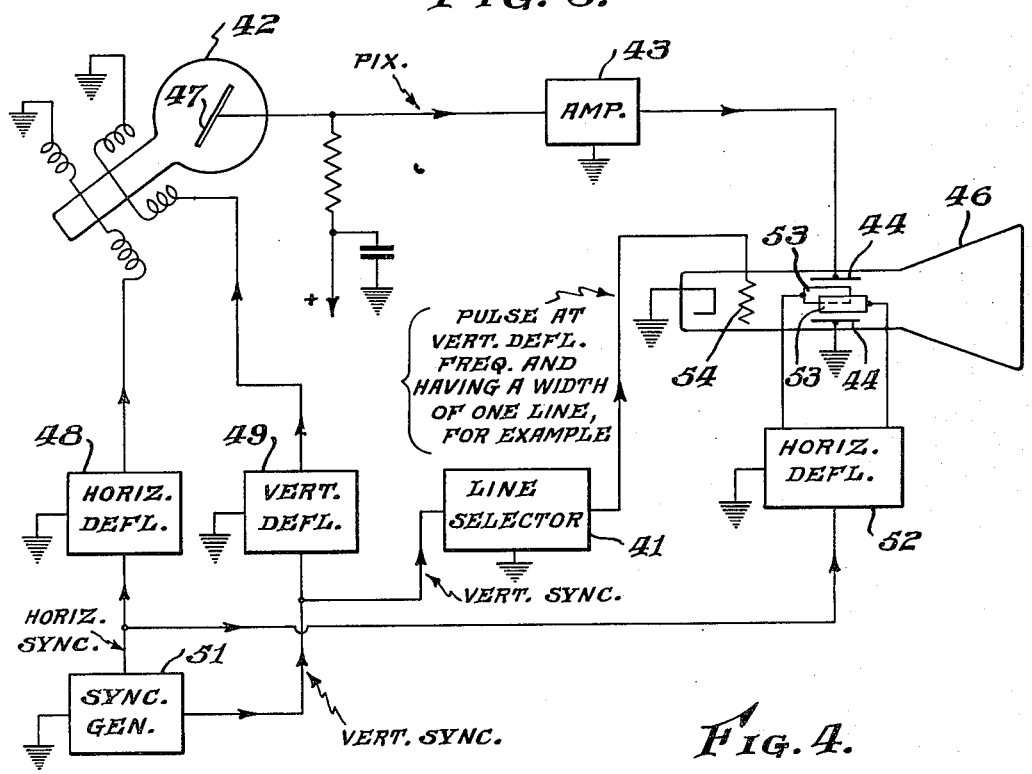
Figure 4:
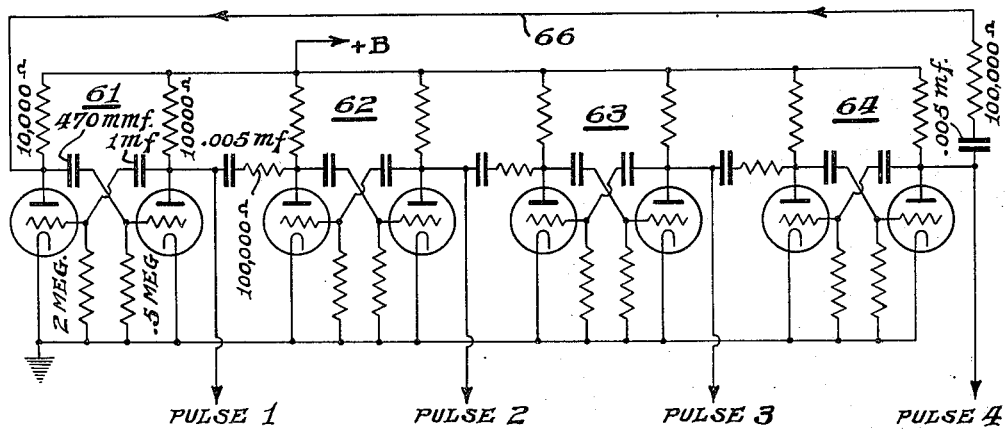
Figure 5:
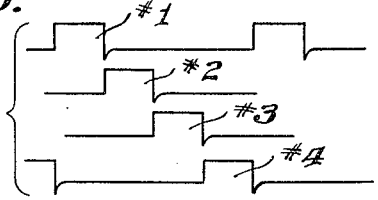

The invention will be better understood from the following description taken in connection with the accompanying drawings in which Fig. 1 is a circuit diagram of one embodiment of the invention, Figs. 2a to 2c are graphs which are referred to in explaining the operation of the circuit of Fig. 1, Fig. 3 is a block diagram showing the application of my invention to a line selector for use in testing television equipment or the like, Fig. 4 is a diagram showing an electrical commutating or switching circuit embodying my invention, and Fig. 5 is a group of graphs that illustrate the operation of the circuit in Fig. 4.

In Fig. 1 a multivibrator 10 comprising vacuum tubes 11 and 12 has the usual plate to grid coupling through condensers C1 and C2. The leak paths for condensers C1 and C2 are through grid resistors R1 and R2, respectively. Plate voltage is applied to the tubes 11 and 12 through plate resistors 13 and 14, respectively, of any suitable value such as 10,000 ohms. In this figure various circuit values are indicated, merely by way of example, in microfarads, ohms and megohms. It will be noted that the multivibrator circuit is asymmetrical, the values of capacity and resistance for C2 and R2, respectively, being much larger than the corresponding values for C1 and R1. The asymmetry is a matter of time constants, the time constant of C1 R1 being much smaller than the time constant of C2 R2. It will be understood, therefore, that in some designs the condensers C1 and C2 may have like values, for example, provided the resistance of resistor R1 is enough less than the resistance of R2.

When provided with the circuit constants indicated above, the multivibrator 10 produces the pulses A shown in Fig. 2b, there being, incidentally, a very narrow negative "back-kick" pulse following the back edge of pulse A. Also, the multivibrator is not self-oscillatory at the desired frequency and must be driven by pulses such as the synchronizing pulses shown in Fig. 2a.

An additional characteristic of a multivibrator with these circuit constants is that it may be triggered off by a negative pulse (the front edge of this pulse corresponding to the back edge of the preceding positive pulse) when the synchronizing pulse is applied to the plate of the tube having the smaller of the two coupling condensers connected to it.

A second multivibrator 21 comprising tubes 22 and 23 is connected in cascade with multivibrator 10 to be driven at the frequency of the pulses A. This multivibrator is similar to the preceding one but, in the example shown, the coupling condenser C3 at the plate of tube 22 is of smaller capacity than condenser C1 as it is desired, in the example assumed, to obtain the narrower pulses B (Fig. 2c) at the output. The coupling between multivibrators may be through a condenser 26 and a resistor 27 connected between the plates of the tubes 12 and 22.

In operation, synchronizing pulses S (Fig. 2a) may be applied to the plate of tube 11 through a condenser 31 and a resistor 32. The pulses A and B are produced at the plates of tubes 12 and 23, respectively, in the time relation shown in Figs. 2a, 2b and 2c.

The width of the pulses A may be varied by varying the position of an adjustable tap 36 on a voltage divider 37 to change the amount of positive bias on the tube 12. A bypass condenser 38 may be provided. Similarly, the pulses B may be varied in width by adjusting a variable tap 39.

As will be apparent from a comparison of the graphs in Figs. 2a, 2b and 2c, the timing or phase of the output pulse B with respect to the synchronizing pulse S may be varied simply by adjusting the position of the variable tap 36 and thus changing the width of the pulse A.

In some cases it may be desired to utilize the delay of a plurality of multivibrators. For example, the output of multivibrator 21 may trigger another multivibrator (not shown) by the back edge of the pulse B so that a delay equal to the duration of pulse A plus that of pulse B is obtained. When the multivibrators 10 and 21 are used in this way, the lower end of the 0.2 megohm grid resistor of tube 23 may be connected to the lower end of the grid resistor R1 instead of to the tap 39 whereby a change in the position of tap 36 will change the width of pulses A and B simultaneously.

In Fig. 3 there is illustrated one application of my invention where the circuit of Fig. 1 is utilized as a line selector, indicated by the block 41, for testing television equipment or the like. This equipment, as shown in Fig. 3, comprises a picture pickup tube 42, such as an Iconoscope, which supplies picture signal through an amplifier 43 to one pair of deflecting plates 44 of a cathode ray oscillograph tube 46. The cathode ray of the pickup tube 42 is deflected horizontally and vertically for scanning the mosaic 47 by means of deflecting circuits 48 and 49, respectively, which are driven from a synchronizing pulse generator 51.

Horizontal synchronizing pulses are supplied also to a horizontal deflecting circuit 52 which applies a deflecting voltage to a pair of deflecting plates 53.

The line selector 41 is driven by the vertical synchronizing pulses, these pulses corresponding to the synchronizing pulses S of Fig. 2a. The output pulses of the line selector 41 are applied to a control grid 54 of the cathode ray tube with positive polarity, these pulses corresponding to the pulses B of Fig. 2c. The tube 46 is biased to beam cutoff in the absence of pulses B. Thus, the cathode ray can trace a curve on the oscillograph screen only during the time a pulse B is on the control grid. It will be evident that by varying the timing and width of a pulse B it is possible to obtain an oscillograph trace for any desired scanning line or group of adjacent scanning lines on the pickup tube mosaic 47 and thus investigate the mosaic surface.

In Fig. 4, I have shown my invention applied to a commutating or switching system that continuously produces sequentially occurring pulses. In the example illustrated there are four multivibrators 61, 62, 63 and 64 connected in cascade. The output circuit of multivibrator 64 is coupled back through a conductor 66 to the input circuit of multivibrator 61. The four multivibrators may be alike so that they produce successively the like pulses shown in Fig. 5. As in Fig. 1, the multivibrators are asymmetrical and are coupled so that the back edge of a pulse from one multivibrator triggers the next succeeding multivibrator. Thus, as shown in Fig. 5, the back edge of pulse No. 1 from unit 61 triggers unit 62 to produce pulse No. 2; and at the end of pulse No. 2 the next unit 63 is triggered. The final pulse No. 4 from unit 64 triggers the first unit 61 and the action repeats.

The pulses 1, 2, 3 and 4 may be utilized from various control purposes. It will be understood that they may be given different widths, if desired, and these widths may be adjustable as previously described. Suitable circuit values are indicated in Fig. 4 merely by way of example.

I claim as my invention:

1. Apparatus for producing an electrical pulse occurring in a certain delayed time relation to a synchronizing signal, said apparatus comprising an asymmetrical multivibrator to which said synchronizing signal is applied to make said multivibrator produce positive pulses, a second asymmetrical multivibrator comprising a pair of vacuum tubes each having a plate and a control electrode, each tube having a grid leak resistor and having a condenser coupling its plate to the control electrode of the other tube, one of said condensers and its associated grid leak resistor having a substantially smaller time constant than that of the other condenser and its associated grid leak resistor and means for applying said positive pulses to the plate of the tube in said second multivibrator which has said one condenser connected thereto whereby said second multivibrator is triggered by the back edge of said positive pulse.

2. The invention according to claim 1 wherein said first multivibrator includes means for varying the width of said positive pulse.

3. In combination, a plurality of asymmetrical multivibrators each comprising a pair of vacuum tubes, each tube having a plate and a control grid, each pair of tubes having grid leak resistors and having condensers coupling the plate of one tube to the control grid of the other tube, one of said condenser and its associated grid leak resistor having a substantially smaller time constant than that of the other condenser and its associated grid leak resistor and means for applying the positive pulses produced by each multivibrator to the plate of the tube in the succeeding multivibrator which has said one condenser connected thereto whereby said succeeding multivibrator is triggered by the back edge of said positive pulse.

4. The invention according to claim 3 wherein means is provided in at least one of said multivibrators for applying an adjustable positive bias to the control grid which has connected thereto the grid leak resistor that is located in the small time constant circuit.

5. A pulse generating system comprising a plurality of asymmetrical multivibrators each comprising a pair of vacuum tubes, each tube having a plate and a control grid, each pair of tubes having grid leak resistors and having condensers coupling the plate of one tube to the control grid of the other tube, one of said condensers and its associated grid leak resistor having a substantially smaller time constant than that of the other condenser and its associated grid leak resistor and means for applying the positive pulses produced by each multivibrator to the plate of the tube in the succeeding multivibrator which has said one condenser connected thereto whereby said succeeding multivibrator is triggered by the back edge of said positive pulse, said last means including means for coupling the output circuit of the last multivibrator to the input circuit of the first multivibrator whereby electrical pulses are produced continuously and successively by said multivibrators.

6. In combination, a first trigger circuit having only one degree of electrical stability, said trigger circuit comprising a pair of electrode structures which are interconnected so that one structure is conductive and the other non-conductive in the stable state, and vice versa in the active state, a connection for supplying an input impulse to said circuit for changing it from the stable to the active or unstable state, an adjustable element for controlling the time of return of said circuit to the stable state, a second similar trigger circuit having a stable state and an active state, and means actuated by the return of the first trigger circuit to its stable state for causing the second trigger circuit to go into its active or unstable state, means in said second trigger circuit for controlling the duration of its active state, and connections for utilizing a voltage developed by said second trigger circuit.

7. A time delay circuit comprising first and second self-restoring trigger circuits, each having a pair of electrode structures including a grid and an anode, impedance elements cross-coupling the grids and anodes of the electrode structures of each trigger circuit, means for unsymmetrically biasing the grids of the electrode structures of each trigger circuit, each of said circuits having a stable and an active state therefor, each of said trigger circuits having adjustable means for controlling the time duration of the pulse produced thereby, and means responsive to an output pulse of predetermined polarity from said first trigger circuit for supplying a tripping pulse at a later time to said second trigger circuit.

ALFRED C. SCHROEDER.